United States Patent
Knipstrom et al.

[11] 3,930,138
[45] Dec. 30, 1975

[54] APPARATUS FOR WELDING VERTICAL JOINTS

[75] Inventors: Karl-Erik Knipstrom; Heinz Oskar Uhlig; Knut Folke Ingemar Boden, all of Laxa, Finland

[73] Assignee: Elektriska Svetsningsaktiebolaget, Gotenburg, Sweden

[22] Filed: May 21, 1974

[21] Appl. No.: 471,902

[30] Foreign Application Priority Data
May 22, 1973  Sweden.............................. 7307170

[52] U.S. Cl................................ 219/126; 219/73
[51] Int. Cl.² ....................... B23K 9/12; B23K 9/28
[58] Field of Search............................. 219/73, 126

[56] References Cited
UNITED STATES PATENTS

| | | | |
|---|---|---|---|
| 3,210,520 | 10/1965 | Arnold et al. | 219/126 |
| 3,382,344 | 5/1968 | Hasegawa et al. | 219/126 |
| 3,518,397 | 6/1970 | Hannahs | 219/126 X |
| 3,666,908 | 5/1972 | Crichton | 219/126 X |
| 3,710,068 | 1/1973 | Calton et al. | 219/126 X |
| 3,808,396 | 4/1974 | Ashton et al. | 219/126 |
| 3,825,716 | 7/1974 | Kokura et al. | 219/126 X |

FOREIGN PATENTS OR APPLICATIONS

| | | | |
|---|---|---|---|
| 402,945 | 2/1969 | Australia | 219/126 |
| 25,676 | 11/1964 | Japan | 219/126 |

Primary Examiner—C. L. Albritton
Assistant Examiner—N. D. Herkamp
Attorney, Agent, or Firm—Cameron, Kerkam, Sutton, Stowell & Stowell

[57] ABSTRACT

Apparatus for welding vertical joints in which a consumable guide extending along the welding gap is supported by mechanism for imparting a rotation to the consumable guide and in which the consumable guide has an exterior screw thread engaging a nut member supporting the shoes.

4 Claims, 6 Drawing Figures

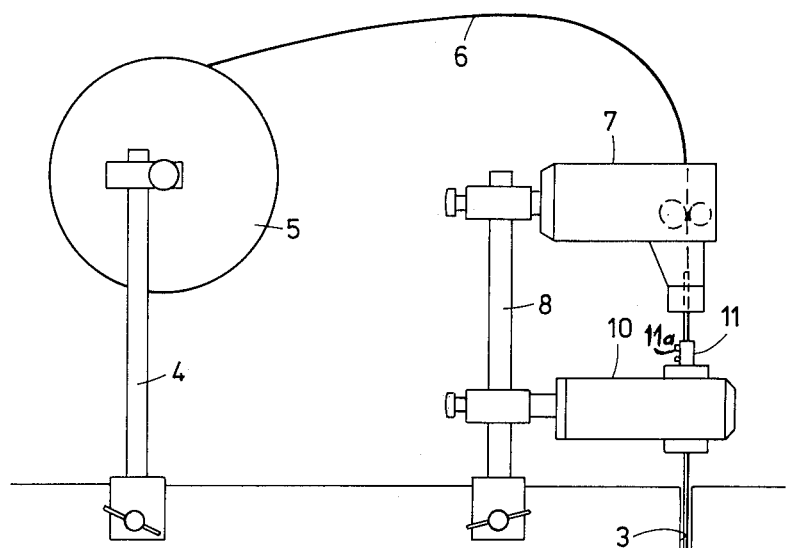
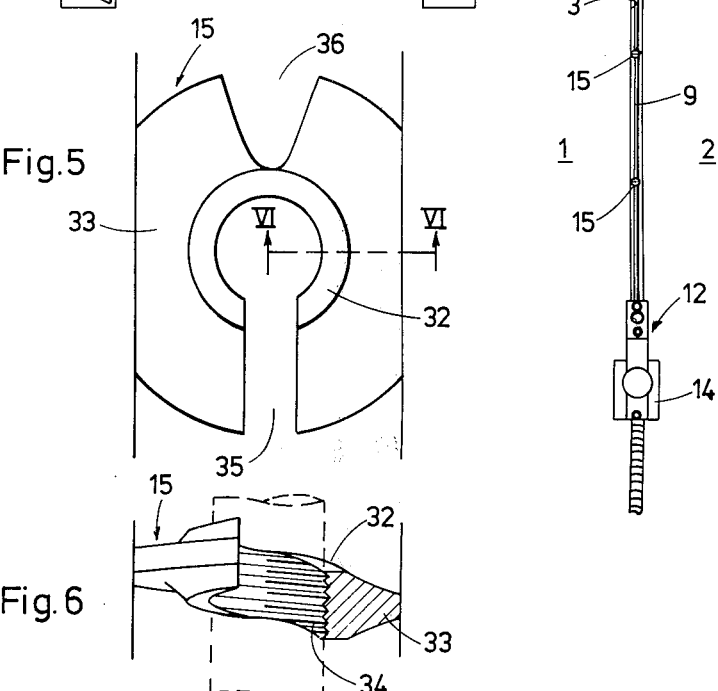

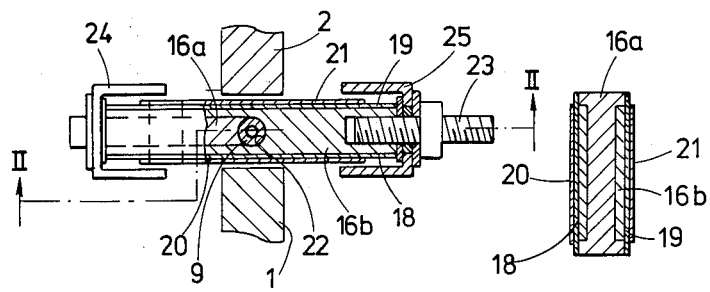
Fig. 3
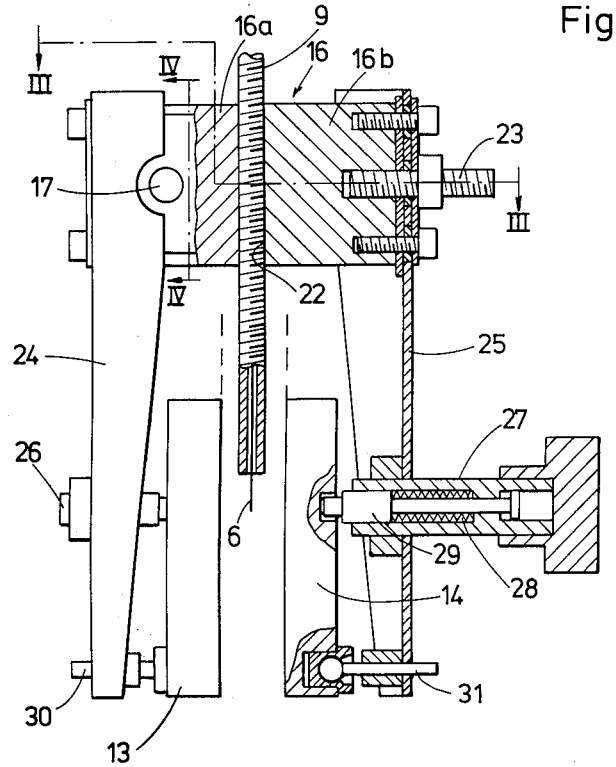
Fig. 4
Fig. 2

APPARATUS FOR WELDING VERTICAL JOINTS

BACKGROUND OF THE INVENTION

The invention relates to apparatus for welding a substantially vertical joint between a pair of metal parts separated by a welding gap. More particularly, the invention relates to apparatus for said purpose of the type comprising welding pool confining means vertically movable along the welding gap, a tubular consumable guide member arranged along and within the welding gap, an electrode advancing unit for feeding a fusible electrode downwards through said consumable guide member, and means for suspending the welding pool confining means from the guide member, including mechanism for shifting the point of support for the welding pool confining means on the guide member upwards along the guide member so as to maintain the welding pool confining means in the proper position with respect to the welding pool. A known type of mechanism for this purpose is provided with a manually operable jack by means of which the welding pool confining mechanism is shifted upwards one step at a time. Also, it has been suggested to suspend the welding pool confining means from a carriage provided with one or more power driven wheels frictionally engaging the consumable guide member. The prior art shifting mechanisms considerably increase the total weight of the suspension means.

SUMMARY OF THE INVENTION

The invention provides improved apparatus for welding a substantially vertical joint between two metal parts separated by a welding gap, comprising a consumable, tubular guide member provided with an external screw thread, an electrode advancing unit for feeding a fusible electrode downwards through said consumable guide member, a guide member supporting unit for positioning said consumable guide member along and within said welding gap, said supporting unit comprising an annular member mounted for rotation in said unit, means for clamping the consumable guide member in said annular member, and means for rotating said annular member, means for supporting said guide member supporting unit in a stationary position with regard to said metal parts, welding pool confining means vertically movable along the welding gap, and, means supporting said welding pool confining means comprising a nut member engaging the screw thread of the consumable guide member.

In the apparatus according to the invention, the consumable guide member constitutes a part of the mechanism for shifting the welding pool confining means, and the nut member is the only part of the shifting mechanism which shares the motion and adds to the weight of the welding pool confining means.

Other advantages and features of the invention will be apparent from the following description, the accompanying drawings and the appended claims.

BRIEF DESCRIPTION OF THE DRAWINGS

FIG. 1 is a side view of a pair of plates to be welded and welding equipment embodying the invention fitted thereon;

FIG. 2 is a side view taken at right angles to FIG. 1, partly in section, of the movable system formed by the welding pool confining means and the members supporting said means;

FIG. 3 is a plan view, partly in section, taken along the line III—III of FIG. 2;

FIG. 4 is a sectional view taken along the line IV—IV of FIG. 2;

FIG. 5 is a plan view on a greater scale of a spacing member; and

FIG. 6 is a side view of the spacing member, partly in sectional view taken along the line VI—VI of FIG. 5.

DESCRIPTION OF THE PREFERRED EMBODIMENT

FIG. 1 shows a pair of vertical plates 1, 2 separated by a gap 3. A standard 4 clamped to the upper edge of the plate 1 carries a reel 5 for a continuous wire electrode 6. A second standard 8 clamped to the plate 1 supports an electrode advancing unit 7 and a guide member supporting unit 10. The guide member supporting unit 10 comprises a rotary sleeve 11 and a motor with suitable speed reduction gear for rotating the sleeve 11a. A tubular fusible guide member 9 held in the sleeve 11 by clamping screws 11a extends into and along the gap 3 between the plates 1, 2. The wire electrode 6 is advanced through the fusible guide member 9 towards the welding pool. Electrically insulating spacers 15 maintain the guide member 9 properly centred in the gap 3. The guide member 9 is provided with an external screw thread the function of which will be explained below. A pair of water cooled shoes 13, 14 serving to confine the welding pool are supported by a supporting unit 12 which again is supported by the consumable guide member 9. Referring now to FIGS. 2 to 4, the supporting unit (12, FIG. 1) is composed of a yoke 16 and a pair of shanks 24, 25 each of which carries one of the shoes 13, 14. The yoke is provided with a threaded bore 22 engaging the screw thread of the consumable guide member 9. To facilitate the application of the yoke to the guide member as well as the removal of the yoke from the guide member on completion of the weld, the yoke is composed of two parts or halves 16a, 16b, each of which is provided with a semicylindrical portion of the threaded bore 22. A bolt 17 keeps the parts 16a, 16b together. The part 16b straddles the consumable guide member 9 and the part 16a. To prevent a short circuit between the yoke 16 and the plates 1, 2, the exterior side faces of the yoke part 16b are each covered by a sheet 18, 19 of insulating material protected against wear by a metal sheet 20, 21. The yoke part 16b is provided with a contact terminal 23 for a welding cable for the supply of the welding current to the consumable guide member 9 and the wire electrode 6.

Each of the shoes 13, 14 is supported by a screw 26, 27, respectively, fitted in a threaded bore in the shank 24, 25, respectively, to allow the spacing of the shoes 13, 14 to be adapted to the thickness of the plates 1, 2. To render the shoes capable of adapting themselves automatically to minor thickness variations during the welding operation, the screw 27 is provided with a slide member 29 axially displaceable in a central bore of the screw 27 and actuated by a pile of spring washers 28 the compression of which is controlled by the screw 27. To prevent angular displacement of the shoes about the axis of the screws 26, 27, the lower end of each of the shoes is connected to a guide pin 30, 31, respectively, which is axially displaceable in a corresponding guide member attached to the shank 24, 25, respectively.

FIGS. 5 and 6 illustrate a convenient form of the spacing members 15 of FIG. 1. The spacing member consists of a slit, helically curved sleeve 32 provided with a flange 33. The spacing member is made from a comparatively soft and pliable plastic. To apply the spacing member on the consumable guide member, the walls of the radial slit 35 have to be forced apart slightly; to facilitate this, the flange 33 has a triangular incision 36 opposite to the slit 35. The screw thread 34 is impressed into the sleeve 32 by the pressure against the screw thread of the consumable guide member. The outer edge of the flange has a pair of opposed, straight portions for engaging the workpieces 1, 2. As the spacing member cannot rotate in the welding gap, owing to the outline described, the rotation of the screw-threaded consumable guide member will cause the spacing member to move upwards at the same pace as the yoke 16. As soon as the spacing member emerges from the upper end of the welding gap, it can be removed from the consumable guide member.

The apparatus described has been developed primarily for electroslag welding, but is applicable to gas-shielded arc welding as well. The electrode advancing unit 7 may be arranged to operate intermittently or continuously and to be controlled either by the operator or by automatic means, for instance by a control circuit provided with means for sensing the position of the slag puddle in relation to the shoes. These various possibilities are well known and do not have to be explained in detail. Also, the arrangements for the water-cooling of the shoes are well known from prior art and require no description.

We claim:

1. Apparatus for welding a substantially vertical joint between two metal parts separated by a welding gap, comprising a consumable, tubular guide member provided with an external screw thread, means for supplying a welding current to said consumable guide member, an electrode advancing unit for feeding a fusible electrode downwards through said consumable guide member, a guide member supporting unit for holding said consumable guide member along and within said welding gap, said supporting unit comprising an annular member mounted for rotation in said unit, means for clamping the consumable guide member in said annular member, and means for rotating said annular member, means for supporting said guide member supporting unit in a stationary position with regard to said metal parts, welding pool confining means vertically movable along the welding gap, and, means supporting said welding pool confining means comprising a nut member engaging the screw thread of the consumable guide member.

2. Apparatus as claimed in claim 1 in which the nut member is composed parts two pars each of which engages not more than one-half of the circumference of the consumable guide member and releasable means for joining said parts.

3. Apparatus as claimed in claim 2 for welding a butt joint, in which the welding pool confining means comprises a pair of shoes, and which comprises means connecting each of said shoes with one part of the nut member.

4. Apparatus as claimed in claim 1 which further comprises at least one electrically insulating spacing member engaging the screw thread of the consumable guide member, said spacing member having a non-circular circumferential outline to prevent rotation of said spacing member with the consumable guide member.

* * * * *

UNITED STATES PATENT OFFICE
CERTIFICATE OF CORRECTION

PATENT NO. : 3,930,138
DATED : December 30, 1975
INVENTOR(S) : Knipstrom et al

It is certified that error appears in the above-identified patent and that said Letters Patent are hereby corrected as shown below:

Change inventors' country of residence from "Finland" to --Sweden--.

Claim 2, line 2, after "composed" insert --of two--, and same line, after "parts" delete "two pars".

Signed and Sealed this twenty-seventh Day of April 1976

[SEAL]

Attest:

RUTH C. MASON
Attesting Officer

C. MARSHALL DANN
Commissioner of Patents and Trademarks